Patented Feb. 20, 1945

2,369,647

UNITED STATES PATENT OFFICE 2,369,647

PROCESS FOR PREPARING THIOKETONES

Leslie G. S. Brooker and Grafton H. Keyes, Rochester, N. Y., assignors to Eastman Kodak Company, Rochester, N. Y., a corporation of New Jersey No Drawing. Application March 11, 1942, Serial No. 434,216

8 Claims. (Cl. 260—304)

This invention relates to a process for preparing thioketones which are useful as intermediates in the preparation of carbocyanine and merocarbocyanine dyes.

Thioketones of the following general formula:

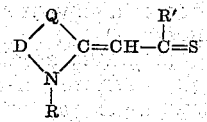

wherein D represents phenylene or naphthylene, Q represents sulfur or selenium and R and R' each represents an organic radical, are highly useful materials for the preparation of quaternary salts of the general formula:

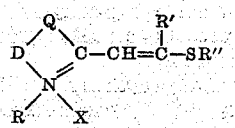

wherein D, Q, R and R' have the values given above and R'' represents an alkyl group and X represents an acid radical, which quaternary salts are, in turn, valuable intermediates for the synthesis of carbocyanine and merocarbocyanine dyes.

In our copending applications Serial Nos. 356,656 and 356,657, each filed September 13, 1940, we have described the preparation of such thioketones by the treatment of halogenovinyl derivatives with (1) thioamides and (2) sulfides or thiosulfates. While each of these methods is satisfactory, each involves the use of a halogenovinyl derivative which must be obtained from the corresponding oxoketone. We have now found that the aforesaid thioketones can be prepared directly from the oxoketones without going through the intermediate halogenovinyl stage.

It is, accordingly, an object of our invention to provide an improved process for preparing our thioketones. Other objects will become apparent hereinafter.

In accordance with our invention, we prepare our thioketones by treating the corresponding oxoketones with phosphorous pentasulfide. Advantageously, the process is carried out in a pyridine medium. The oxoketones which we employ in practicing our invention can be represented by the following general formula:

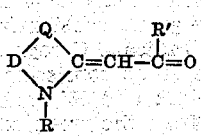

wherein D represents a phenylene or naphthylene group, Q represents sulfur or selenium and R and R' each represents an organic radical one end of which may be attached to the D group. More specifically R can represent an alkyl group, such as methyl, ethyl, isoamyl, β-ethoxyethyl, benzyl or allyl for example, or an aryl group, such as phenyl. R' can represent an alkyl group, such as those given above under R, or an aryl group, such as phenyl, naphthyl or furyl, for example.

The following examples will serve to illustrate our invention.

*Example 1—5-chloro-3-ethyl-2-thiopropionyl-methylenebenzoselenazoline*

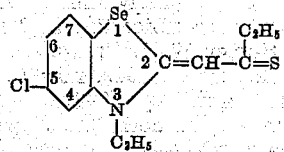

6.3 g. (1 mol.) of 5-chloro-3-ethyl-2-propionylmethylenebenzoselenazoline, 4.4 g. (1 mol.) of phosphorous pentasulfide and 20 cc. of pyridine were refluxed together for ten minutes. The greenish solution obtained was poured out into 150 cc. of water. The product separated as a sticky mass. It was purified by extraction with ligroin (B. P. 90–120°) and 1.1 g. of yellow crystals M. P. 165–167° was obtained. The yield was 16%.

*Example 2—3-ethyl-2-thioacetylmethylenebenzothiazoline*

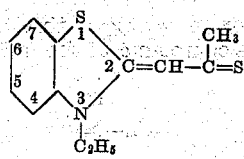

4.4 g. (1 mol.) of 2-acetylmethylene-3-ethyl-benzothiazoline, 4.4 g. (1 mol.) of phosphorous pentasulfide and 20 cc. of pyridine were refluxed for ten minutes. This gave a dirty, dark greenish solution which was poured out into 150 cc. of water. A black solid separated which was collected and washed with water. This product was purified by extraction with ligroin (90–120°). The yield was .6 g. (10%). M. P. 142–144 dec.

*Example 3—1-ethyl-2-thiobenzoylmethylene-β-naphthothiazoline*

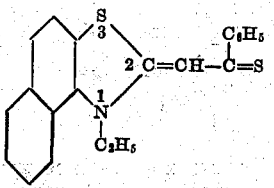

3.3 g. (1 mol.) of 2-benzoylmethylene-1-ethyl-β-naphthothiazoline, 2.2 g. (1 mol.) of phosphorous pentasulfide and 20 cc. of pyridine were heated together at refluxing temperature for fifteen minutes. The reaction mixture was then poured out into 150 cc. of water. The solid which separated was collected on a filter. It was purified by stirring up with 200 cc. of boiling methyl alcohol after which it was collected on a filter and dried. A yield of 3.3 g. (94%) was obtained. A small portion was recrystallized from methyl alcohol and obtained as brownish crystals. M. P. 205-207 dec.

In a manner similar to that illustrated in the foregoing examples, 1-ethyl-2-thioacetylmethylene-β-naphthothiazoline can be prepared from 2-acetylmethylene-1-ethyl-β-naphthothiazoline, 3-ethyl-2-thioacetylmethylene-α-naphthothiazoline can be prepared from 2-acetylmethylene-3-ethyl-α-naphthothiazoline and 3-phenyl-2-thioacetylmethylene benzothiazoline from 2-acetylmethylene-3-phenylbenzothiazoline. 2-acetylmethylene-3-phenylbenzothiazoline can be prepared by treating 2-methylbenzothiazole pheniodide with acetyl chloride, in pyridine in accordance with the process of United States Patent 2,112,139, dated March 22, 1938. The 2-methylbenzothiazole pheniodide can be prepared by oxidizing thioacetyldiphenylamine with iodine (see the copending application of Leslie G. S. Brooker and Homer W. J. Cressman, Serial No. 353,502, filed August 21, 1940, now U. S. Patent 2,317,357, dated April 27, 1943). Also 2-thioacetylmethylene-3,4-trimethylenebenzothiazoline can be prepared from 2-acetylmethylene-3,4-trimethylenebenzothiazoline. 2-acetylmethylene-3,4-trimethylenebenzothiazoline can be prepared by treating 2-methyl-3,4-trimethylenebenzothiazolium iodide with acetyl chloride in pyridine in accordance with the process set forth in United States Patent 2,112,139, dated March 22, 1938. The 2-methyl-3,4-trimethylenebenzothiazolium iodide can be prepared as described in the aforesaid Brooker and Cressman copending application.

What we claim as our invention and desire to be secured by Letters Patent of the United States is:

1. A process for preparing a thioketone comprising treating a compound of the following general formula:

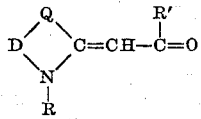

wherein D represents a divalent organic radical selected from the group consisting of phenylene and naphthylene radicals, Q represents an atom selected from the group consisting of sulfur and selenium radicals, R and R' each represents a member selected from the group consisting of alkyl and aryl groups with phosphorous pentasulfide.

2. A process for preparing a thioketone comprising treating a compound of the following general formula:

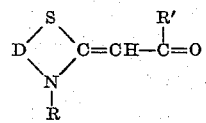

wherein D represents a phenylene group and R and R' each represents an alkyl group, with phosphorous pentasulfide.

3. A process for preparing a thioketone comprising treating a compound of the following general formula:

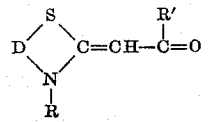

wherein D represents a naphthylene group and R and R' each represents an alkyl group, with phosphorous pentasulfide.

4. A process for preparing a thioketone comprising treating a compound of the following general formula:

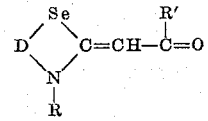

wherein D represents a phenylene group and R and R' each represents an alkyl group, with phosphorous pentasulfide.

5. A process for preparing a thioketone comprising treating, in a pyridine medium, a compound of the following general formula:

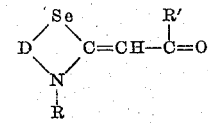

wherein D represents a phenylene group and R and R' each represents an alkyl group, with phosphorous pentasulfide.

6. A process for preparing a thioketone comprising treating, in a pyridine medium, a compound of the following general formula:

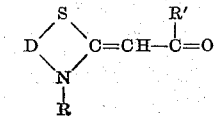

wherein D represents a naphthylene group and R and R' each represents an alkyl group, with phosphorous pentasulfide.

7. A process for preparing a thioketone comprising treating, in a pyridine medium, a compound of the following general formula:

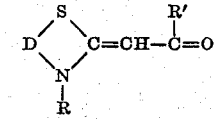

wherein D represents a phenylene group and R and R' each represents an alkyl group, with phosphorous pentasulfide.

8. A process for preparing a thioketone comprising treating, in a pyridine medium, a compound of the following general formula:

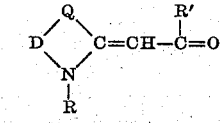

wherein D represents a divalent organic radical selected from the group consisting of phenylene and naphthylene radicals, Q represents an atom selected from the group consisting of sulfur and selenium radicals, R and R' each represents a member selected from the group consisting of alkyl and aryl groups with phosphorous pentasulfide.

LESLIE G. S. BROOKER.
GRAFTON H. KEYES.